HENRY GORTNER.
Improvement in Combined Corn Planter and Plow.

No. 121,357.                                             Patented Nov. 28, 1871.

Witnesses
D. M. Thompson
W. H. H. Francis

Inventor Henry Gortner 121,357

UNITED STATES PATENT OFFICE.

HENRY GORTNER, OF NASHPORT, OHIO.

IMPROVEMENT IN CORN-PLANTERS.

Specification forming part of Letters Patent No. 121,357, dated November 28, 1871.

*To all whom it may concern:*

Be it known that I, HENRY GORTNER, of Nashport, in the county of Muskingum and State of Ohio, have invented certain Improvements in Combined Corn-Planters and Sulky-Plows or Riding Cultivators; and do hereby declare that the following is a full, clear, and exact description thereof, reference being had to the accompanying drawing and letters of reference marked thereon making a part of this specification.

The first part of my invention consists in the construction and arrangement of a sulky-plow or riding cultivator for the cultivation of corn and similar crops, as will be hereafter set forth. The second part of my invention consists of the combination of a corn-planter with the frame and general arrangement of a sulky-plow, so that the machine can be quickly changed from a planter to a cultivator and from a cultivator to a planter.

Figure 1:
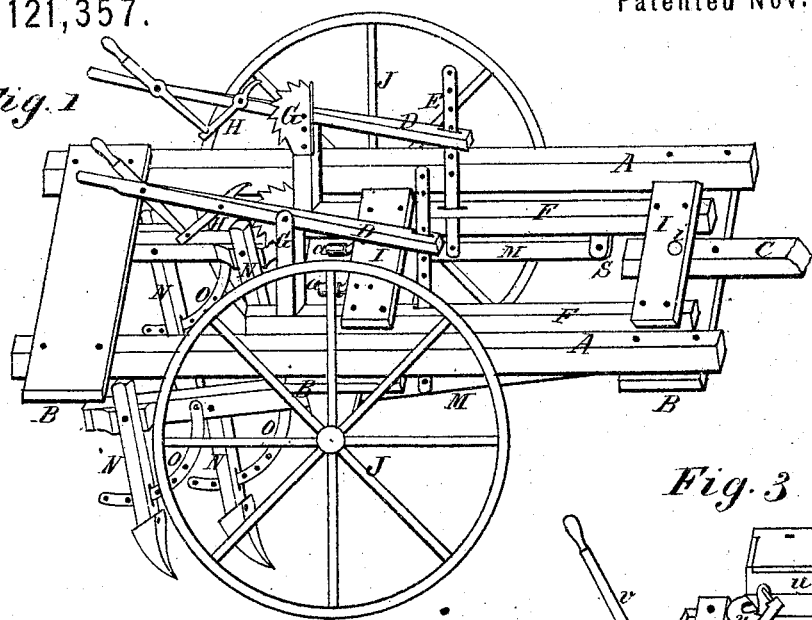
Figure 3:
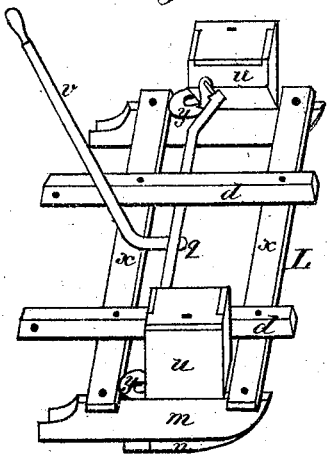
Figure 4:
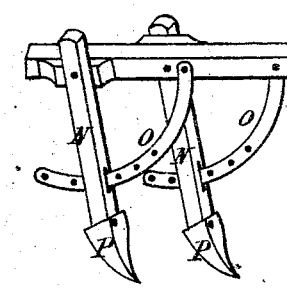
Figure 2:
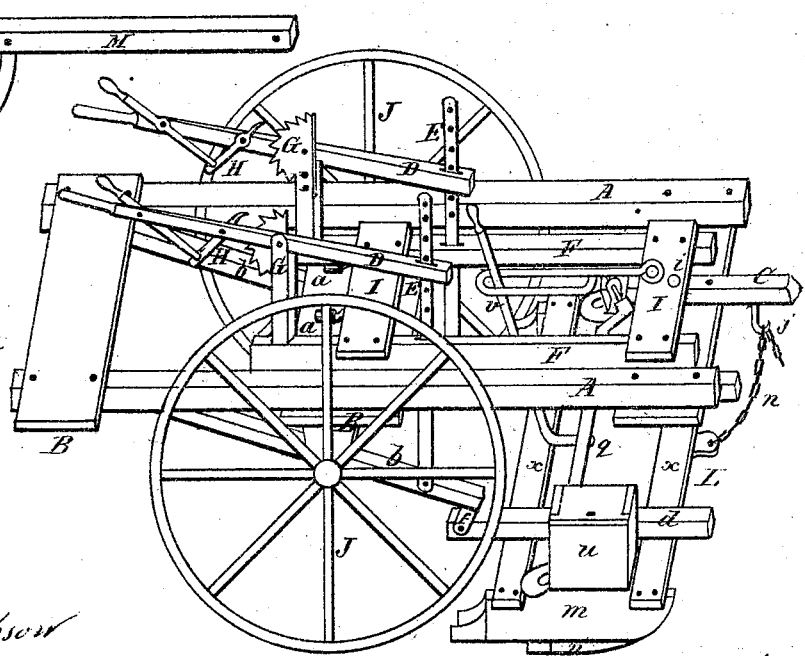

In the following description of the machine, reference is had to the annexed drawing, in which Figure 1 is a perspective of the machine as a sulky-plow. Fig. 2 is a perspective view of the machine as a corn-planter. Fig. 3 is a perspective view of planter detached from the frame. Fig. 4 represents the plow-beams, knees, and molds.

A A, Figs. 1 and 2, represent the main frame of machine, connected by cross-pieces B B B and mounted on wheels J J. C represents the tongue. F F represent the sides of frame, inside of main frame, connected by cross-pieces I I. This frame supports the fulcrums of levers D D and is pivoted on the tongue at $i$, and rests on small rollers $a\ a$ over the middle cross-piece (or axle) of main frame A A, for the purpose of enabling the driver to give the frame an oscillating motion in guiding the plows. The plow-beams M M are hinged to the forward part of frame F F and connected with the supports E E and the levers D D, for the purpose of being raised or lowered at the will of the operator. L, Fig. 3, represents the planter, with the sides $m$, hoppers U U, slides Y Y, lever V, rock-shaft Q. This part of the machine is fully described in Letters Patent No. 97,906, and dated December 14, 1869, with the exception that some small changes are made to adapt the machine to a combination, as hereinbefore described. $b\ b$, Fig. 2, represent the beams connecting the planter L with main frame of machine. These beams are hinged to the hind part of planter and to the hind cross-piece of main frame A A, Figs. 1 and 2, and are also connected with the supports E E, by means of which the planter may be raised or lowered as desired. $h$ represents a chain connecting forward part of planter with the tongue at $j$, for the purpose of supporting the forward part of planter in proper position, and regulating the depth to which the shares enter the ground.

The ratchets G G and pawls H H sufficiently show the purpose of their construction.

What I claim as new, and desire to secure by Letters Patent, is—

1. The combination of the frame F F I J G G with the frame A A, tongue C, and hook $j$, adapted to receive either the plows or planter, substantially as described, and for the purpose set forth.

2. The combination of the frame F F with the lever-fulcrums G G, and levers D D, and supports E E, and the rollers $a\ a$, and pivot $i$, substantially as set forth and described.

HENRY GORTNER.

Witnesses:
DAVID M. THOMPSON,
WILLIAM H. H. FRANCIS. (133)